US008887185B2

(12) United States Patent
Kim

(10) Patent No.: US 8,887,185 B2
(45) Date of Patent: Nov. 11, 2014

(54) METHOD AND SYSTEM FOR PROVIDING VIRTUAL CO-PRESENCE TO BROADCAST AUDIENCES IN AN ONLINE BROADCASTING SYSTEM

(75) Inventor: Jin Soo Kim, Seoul (KR)

(73) Assignee: Yahoo! Inc., Sunnyvale, CA (US)

( * ) Notice: Subject to any disclaimer, the term of this patent is extended or adjusted under 35 U.S.C. 154(b) by 1886 days.

(21) Appl. No.: 11/873,150

(22) Filed: Oct. 16, 2007

(65) Prior Publication Data

US 2009/0019467 A1    Jan. 15, 2009

(30) Foreign Application Priority Data

Jul. 11, 2007    (KR) .................. 10-2007-0069641

(51) Int. Cl.
| | |
|---|---|
| *H04H 60/33* | (2008.01) |
| *H04H 60/45* | (2008.01) |
| *H04N 7/173* | (2011.01) |
| *H04N 21/431* | (2011.01) |
| *H04N 21/475* | (2011.01) |
| *H04N 21/25* | (2011.01) |
| *H04N 21/658* | (2011.01) |
| *H04N 21/439* | (2011.01) |

(52) U.S. Cl.
CPC ....... *H04N 7/17318* (2013.01); *H04N 21/4312* (2013.01); *H04N 21/4756* (2013.01); *H04N 21/252* (2013.01); *H04N 21/4314* (2013.01); *H04N 21/6582* (2013.01); *H04N 21/439* (2013.01)
USPC ................. 725/10; 725/11; 725/114

(58) Field of Classification Search
CPC .................. H04N 21/44222; H04N 21/44213
See application file for complete search history.

(56) References Cited

U.S. PATENT DOCUMENTS 5,726,701 A * 3/1998 Needham ...................... 725/105

(Continued)

FOREIGN PATENT DOCUMENTS

| KR | 1020020000288 A | 1/2002 |
|---|---|---|
| KR | 1020040011591 A | 2/2004 |

OTHER PUBLICATIONS

Preliminary Rejection for KR 10-207-69641 and English translation, Sep. 5, 2009.

(Continued)

*Primary Examiner* — Mark D Featherstone
(74) *Attorney, Agent, or Firm* — James J. DeCarlo; Greenberg Traurig, LLP

(57) ABSTRACT

There is provided an online broadcasting system for providing virtual co-presence to broadcast audiences. The online broadcasting system may comprise a plurality of user terminals, a user reaction processing server and a broadcast server configured to transmit broadcast program data to the user terminals. The user terminals may be configured to: display a broadcast program based on the broadcast program data; receive individual user reaction data from a user input interface; and transmit the received individual user reaction data to the broadcast server. The user reaction processing server may be configured to: receive the individual user reaction data from each of the user terminals; aggregate the individual user reaction data to create total user reaction data based on the received individual user reaction data; generate interface control data based on the total user reaction data, wherein the interface control data, when executed, is operative to cause a client application to generate output indicative of the total user reaction data; and transmit the generated interface control data to at least one of the user terminals.

25 Claims, 6 Drawing Sheets

(56) References Cited

U.S. PATENT DOCUMENTS

2008/0189733 A1* 8/2008 Apostolopoulos .............. 725/28
2008/0320510 A1* 12/2008 Wong et al. ..................... 725/24
2009/0094286 A1* 4/2009 Lee et al. ................... 707/104.1

OTHER PUBLICATIONS

Final Rejection for KR 10-207-69641 and English translation, Jun. 29, 2010.

* cited by examiner

METHOD AND SYSTEM FOR PROVIDING VIRTUAL CO-PRESENCE TO BROADCAST AUDIENCES IN AN ONLINE BROADCASTING SYSTEM

TECHNICAL FIELD

The present invention generally relates to providing virtual co-presence to audiences of a program broadcast in a communication network.

BACKGROUND

As the Internet has become highly integrated into everyday life, Internet websites have emerged as an attractive new medium for providing various entertainment content, such as online games. Especially, as the number of people using such content has grown, various methods were devised to provide the so-called "virtual co-presence" to users using the same contents. The "virtual co-presence" refers to the psychological state of acquiring a feeling that one is at the same place and interacting with other people located in different geographical locations and using the same content at the same time. In the area of online games, visual means such as avatars have been used to provide such a sense of "co-presence" to the users participating in the game.

Meanwhile, the Internet is used nowadays as a new medium for broadcasting various types of entertainment programs (e.g., sports or reality show programs) to Internet users. Many users log on to web sites providing such entertainment programs and view a program to their liking. Especially, when popular sports matches (e.g., U.S. Super Bowl or FIFA Word Cup) are broadcasted live over the Internet, thousands of users may watch the same game through the same website broadcasting the match. These viewers all share the excitement of the live broadcast simultaneously and may express their impression of the game through bulletin postings or other means after the game has ended. However, there are no conventional means to share their viewing experience in real-time with other viewers watching the game through the same website. Thus, there is a need for a method and apparatus for providing "virtual co-presence" to the viewers watching a broadcast program through a communication network by relaying their reactions to the broadcast program in real-time.

SUMMARY

There is provided a method and apparatus for relaying and sharing real-time reactions of viewers watching a program broadcast through a website via an online broadcasting system for providing virtual co-presence to broadcast audiences. The online broadcasting system may comprise a plurality of user terminals, a user reaction processing server and a broadcast server configured to transmit broadcast program data to the user terminals. The user terminals may be configured to: display a broadcast program based on the broadcast program data; receive individual user reaction data from a user input interface; and transmit the received individual user reaction data to the broadcast server or the user reaction processing server. The broadcast server or the user reaction processing server may be configured to: receive the individual user reaction data from each of the user terminals; aggregate the individual user reaction data to create total user reaction data based on the received individual user reaction data; generate interface control data based on the total user reaction data, wherein the interface control data, when executed, is operative to cause a client application to generate output indicative of the total user reaction data; and transmit the generated interface control data to at least one of the user terminals. The individual user reaction data may include a plurality of individual user reaction fields. The broadcast program may be displayed with a plurality of user reaction icons, wherein each of the user reaction icons corresponds to one of the individual user reaction fields. The user terminals may receive the individual user reaction data indicating at least one of the user reaction icons from viewers watching the broadcast program. The user terminals may receive the generated interface control data and generate at least one of the visual, auditory and tactual outputs based on the received interface control data. Said total user reaction data may include a plurality of total user reaction fields, wherein each of the total user reaction fields corresponds to one of the individual user reaction fields. The total user reaction data may be generated by generating each of the total user reaction fields based on the corresponding individual user reaction fields of the received individual user reaction data. The total user reaction fields may be generated by calculating a total user reaction number for each of the user reaction fields.

DESCRIPTION OF EXAMPLE EMBODIMENT(S)

Various embodiments of the present invention will be described below in detail with reference to the accompanying drawings. It will be apparent, however, that these embodiments may be practiced without some or all of these specific details. In other instances, well known process steps or elements have not been described in detail so as not to unnecessarily obscure the description of the present invention.

Figure 1:
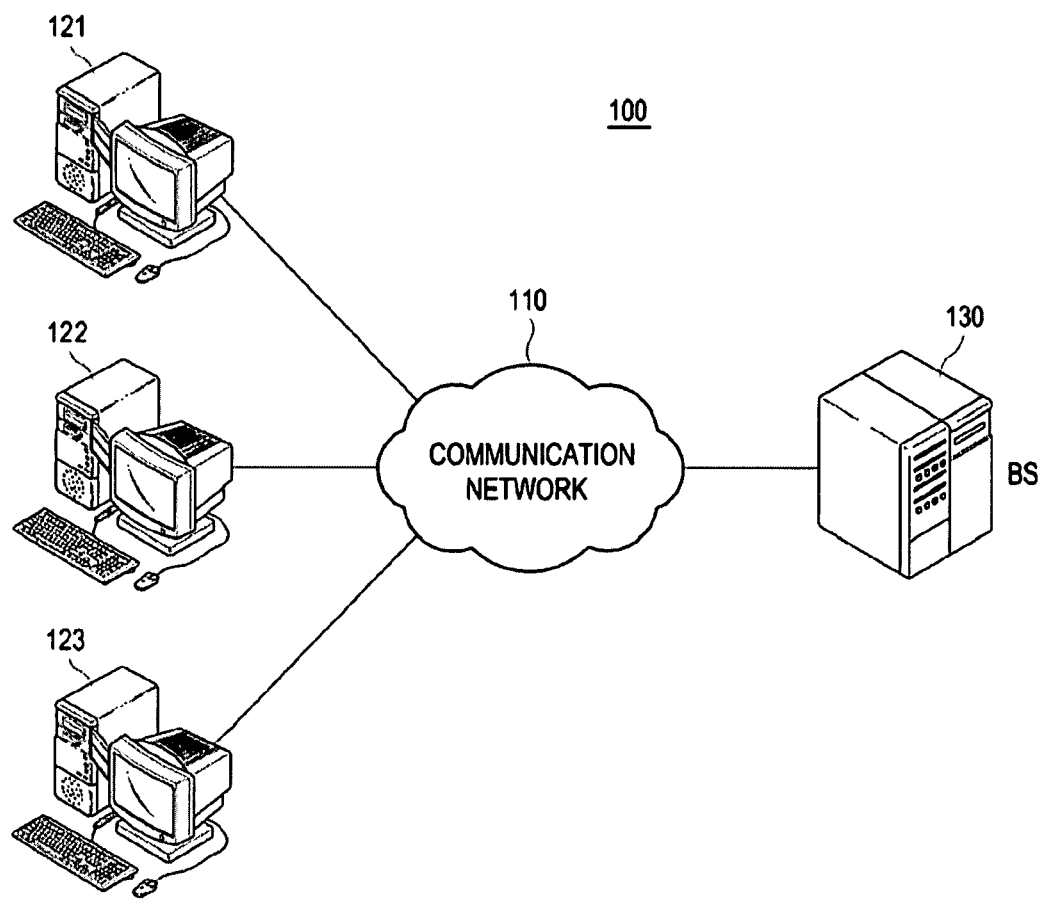
FIG. 1 illustrates a schematic diagram of an online broadcasting system according to one embodiment of the present invention.

FIG. 1 illustrates a schematic diagram of an online broadcasting system according to one embodiment of the present invention. Referring to FIG. 1, the online broadcasting system 100 includes a communication network 110 such as an internet, a plurality of user terminals (UT) 121, 122 and 123 connected to the communication network 110 and a broadcast server 130 broadcasting a program to the user terminals 121, 122 and 123 through the communication network 110. The user terminals 121, 122 and 123 may be personal computers, notebooks or any other terminals with appropriate communication means to provide access to online broadcast services, such as online sports broadcast service provided by the broadcast server 130, to its users. Although only three terminals 121, 122 and 123 are illustrated in FIG. 1 for ease of explanation, it should be noted that fewer or greater than three terminals may be connected to the communication network 110 to access the broadcast server 130.

Figure 6:
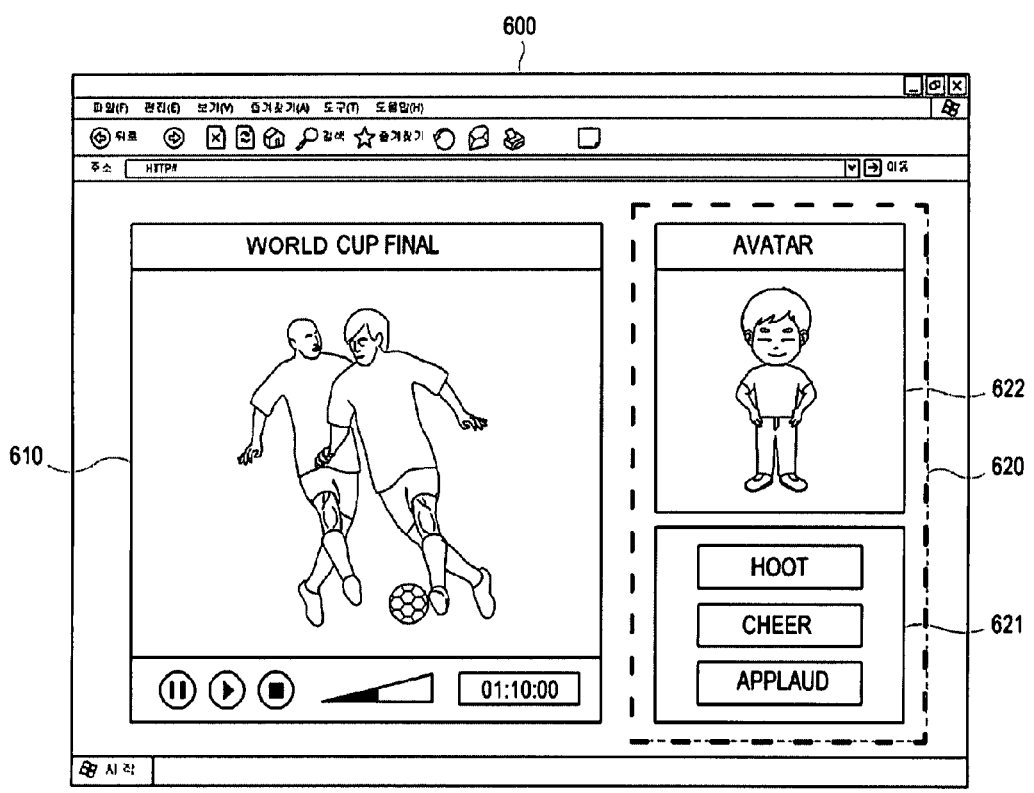
FIG. 6 illustrates example web pages showing broadcast program and audience reactions thereto.

For example, the first, second and third users may respectively log on to the broadcast server 130 through the first, second and third user terminals 121, 122 and 123 to watch the program broadcast from the broadcast server 130 through the communication network 110. After the users log on to the broadcast server 130, each of the user terminals 121, 122 and 123 may receive from the broadcast server 130 the user interface data for displaying a broadcast program display screen. The broadcast program display screen may be prepared by a client application each running on the user terminals 121, 122 and 123. An example of the broadcast program display screen is shown in FIG. 6. Referring to FIG. 6, the broadcast program display screen, such as broadcast program display screen 600, may include a broadcast program display portion 610, which may have a rectangular form, for displaying the program broadcast from the server 130. Further, the broadcast program display screen 600 may include an audience reaction portion 620 for providing the reaction of the users watching the program displayed on the broadcast program display portion 610.

The audience reaction portion 620 may include a user reaction input section 621 for generating individual user reaction data, which indicates the reaction of the corresponding user to the program currently being displayed on the broadcast program display portion. In one embodiment of the present invention, the user reaction input section 621 may include a plurality of user reaction icons, each indicating a predetermined reaction the users may express in response to the broadcast program. For example, the user reaction icons may include a hooting icon, a cheering icon, an applauding icon and any other icons that indicate a specific mood or action the users may have in response to the broadcast program. According to one embodiment, when one of the users selects one of the user reaction icons by clicking or placing a cursor on one of the user reaction icons displayed on the screen of the corresponding user terminal 121, 122 or 123 through a user input interface (e.g., mouse, keyboard, etc.), the corresponding user terminal 121, 122 or 123 generates an individual user reaction data based on such user input. The individual user reaction data may include a plurality of individual user reaction fields, wherein each field corresponds to one of the user reaction icons and includes a flag indicating whether the corresponding user reaction icon has been selected by the user. The flag may be set to "1" when the corresponding user reaction icon has been selected by the user. On the other hand, the flag may be set to "0" when the corresponding user reaction icon has not been selected by the user. The individual user reaction data may be periodically collected for a time interval of a predetermined length and put together as individual user reaction data representative of the time interval. The corresponding user terminal 121, 122 or 123 may transmit for the time interval the generated individual user reaction data to the broadcast server 130.

The broadcast server 130 may receive the individual user reaction data from the user terminals 121, 122 and 123 and aggregate the received individual data to create the total user reaction data based on the received individual user reaction data. The total user reaction data reflects the reactions from all of the users in response to the program broadcast by the broadcast server 130 for a predetermined time interval. In one embodiment, the total user reaction data may contain a plurality of total user reaction fields each corresponding to one of the user reaction fields of the individual user reaction data. The broadcast server 130 may generate the total user reaction data by calculating the total user reaction number for each of the user reaction fields. For each of the user reaction fields of the total user reaction data, the user reaction number may be obtained by calculating the number of the individual user reaction data with the flag of the corresponding user reaction field set to "1." For example, if the individual user reaction data contains the "hooting," "cheering" and "applauding" fields (e.g., an ordered-tuple such as "hooting," "cheering" and "applauding") and the broadcast server 130 receives from each of the user terminals 121, 122 and 123 the individual user reaction data of (1,0,0), (1,0,0) and (0,1,0), then the broadcast server 130 may add the individual user reaction data of (1,0,0), (1,0,0) and (0,1,0) to calculate the total user reaction data as (2,1,0). The broadcast server 130 may generate for the predetermined time interval the total user reaction data to the user terminals 121, 122 and 123. Further, the broadcast server 130 may generate and transmit interface control data based on the total user reaction data to the user terminals 121, 122 and 123 through the communication network 110. The interface control data, when executed, is operative to cause the client application running on each of the user terminals 121, 122 and 123 to generate an output indicative of the total user reaction data. The format and structure of the interface control data may depend on the type of the client application and/or the operating system running on the user terminals 121, 122 and 123.

Each of the user terminals 121, 122 and 123 receives the interface control data and generates visual, auditory and/or tactual output based on the received interface control data. The user terminals 121, 122 and 123 may have monitors, speakers and vibrators for the visual, auditory and tactual outputs, respectively. Other means may be employed for the above sensory output. Those skilled in the art would have no difficulty in selecting the appropriate means for such purpose.

In one embodiment, the user terminals 121, 122 and 123 may output sounds (e.g., hooting, cheering and applauding sounds) corresponding to the received interface control data through the speakers connected thereto. For example, if the interface control data corresponding to the total user reaction data (2,1,0) is received, then a hooting sound and a cheering sound may be outputted through the speaker. The intensity of each of the sound pertaining to one of the user reaction fields may be controlled in accordance with the number indicated by the corresponding field. For the above example, the hooting sound may be outputted with twice the intensity of that of the cheering sound. This configuration accurately reflects the collective reaction of all the users watching the broadcast program.

Further, the user terminals 121, 122 and 123 may control the vibration of the vibrators connected thereto in accordance with the received interface control data. For example, the intensity and frequency of the vibration may be controlled according to the interface control data indicative of the total user reaction. Such vibrators may be used to provide virtual co-presence of other users watching the game, especially a person with visual or hearing impairments. Also, the vibrators may be used in conjunction with other devices to provide a richer experience to the users.

In addition, the user terminals 121, 122 and 123 may provide visual output through the monitors in accordance with the received interface control data. For example, referring to FIG. 6, the audience reaction portion 620 of the broadcast program display screen 600 may include a user reaction output section 622 for providing the visual output. In one embodiment, the reaction output section 622 may include one avatar, which displays certain movements in accordance with the received interface control data. The avatar may display a hooting, cheering or applauding movement. For example, if the interface control data corresponding to the total user reaction data (2,1,0) is received, then the avatar may display the hooting movement since the hooting field has the biggest number. In another embodiment, the reaction output section 622 may include a plurality of avatars, wherein each of the avatars displays one of the predetermined movements in accordance with the received interface control data. For example, each of the avatars may display one of the movements corresponding to the user reaction fields with its flag set to "1" in the received total user reaction data. In the above example, when the interface control data corresponding to the total reaction data (2,1,0) is received, two (among the plurality of avatars) may display the "hooting" and "cheering" movements. Various methods other than the avatars may be used to visually convey the reaction of all the users watching the program broadcast by the broadcast server 130.

All of the above data and signaling messages required to transmit the data may be implemented by using known communication network protocols such as HTTP (Hyper Text Transfer Protocol). Those skilled in the art would have no difficulty in selecting and implementing an appropriate protocol to realize the aforementioned technical configuration.

Each of the broadcast server 130 and user terminals 121, 122 and 123 may include a communication module and a control module to perform the aforementioned functions. The user terminals 121, 122 and 123 may further include a user interface to receive the user inputs from the users. In particular, the communication module may be configured to communicate with other network entities connected to the communication network 110. The broadcast program data, individual user reaction data, total user reaction data and/or interface control data may be communicated to other network entities through the communication network 110 by the communication module. The control module of the broadcast server 130 may be configured to generate the total user reaction data based on the individual user reaction data received from the user terminals 121, 122 and 123. Further, the control module of the broadcast server 130 may be configured to generate the interface control data based on the total user reaction data. The control module of the user terminals 121, 122 and 123 may be configured to: receive the broadcast program data from the broadcast server through the communication module; display a broadcast program based on the broadcast program data; in response to the displayed broadcast program, receive individual user reaction data from the user interface; transmit the received individual user reaction data to a user reaction processing server or the broadcast server through the communication module; and in response to the transmitted individual user reaction data, receive interface control data from the user reaction processing server or the broadcast server.

Figure 2:
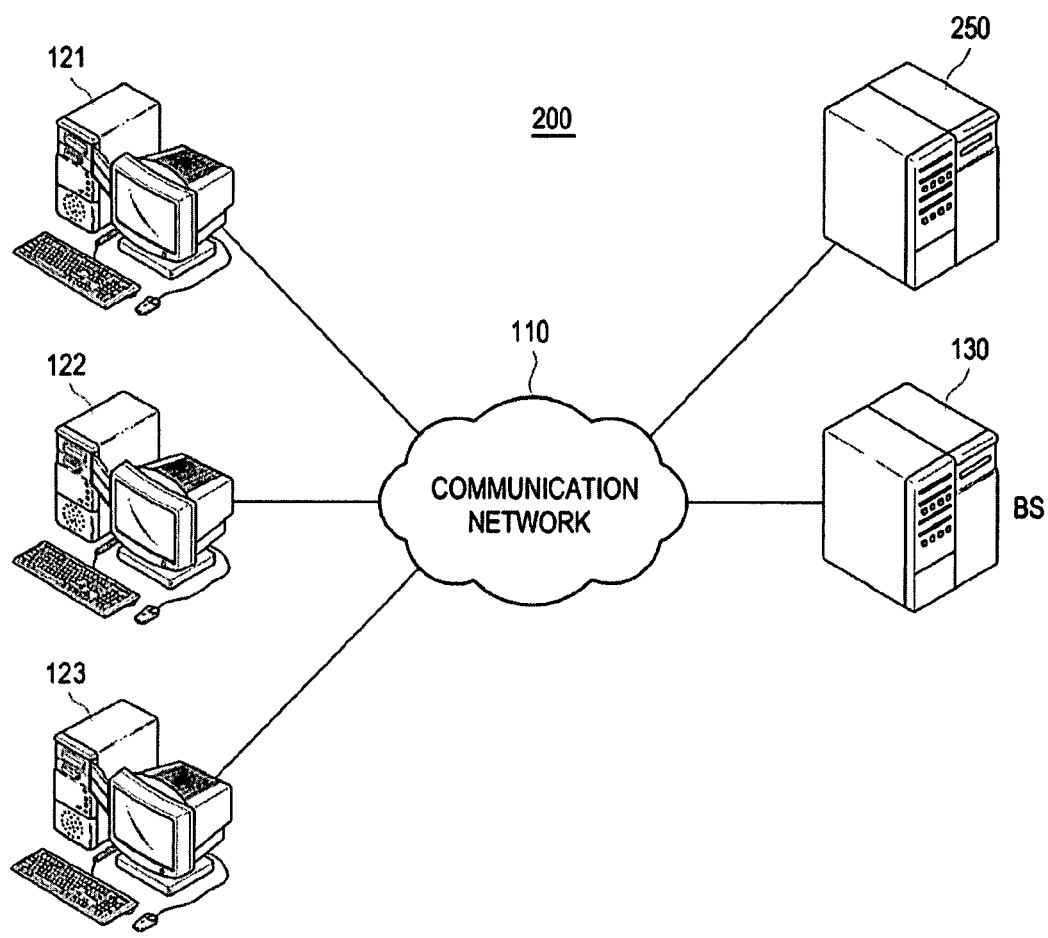
FIG. 2 illustrates a schematic diagram of an online broadcasting system according to another embodiment of the present invention.

FIG. 2 illustrates a schematic diagram of an online broadcasting system according to another embodiment of the present invention. The online broadcasting system 200 in FIG. 2 has a similar configuration to the online broadcasting system 100 shown in FIG. 1. Thus, each component of the online broadcasting system 200, which has substantially the same function as the counterpart shown in FIG. 1, is identified by the same reference numeral and the description thereof will be omitted herein. Further, the features different from the online broadcasting system 100 of FIG. 1 will be explained in detail in the ensuing descriptions.

Referring to FIG. 2, the online broadcasting system 200 further includes a user reaction processing server 250. For example, the user terminals 121, 122 and 123 may receive a program broadcast from a broadcast server 130 and transmit individual user reaction data to the user reaction processing server 250. The user reaction processing server 250 may receive the individual user reaction data from each of the user terminals 121, 122 and 123 and generate total user reaction data based on the received individual user reaction data. In generating the total user reaction data, the user reaction processing server 250 may employ various methods including those described with respect to FIG. 1. Further, the user reaction processing server 250 may generate interface control data based on the generated total user reaction data. Thereafter, the user reaction processing server 250 transmits the generated interface control data to the user terminals 121, 122 and 123. The online broadcasting system according to this embodiment relieves the traffic load of the broadcast server 130 by providing the total user reaction data and the interface control data through a separate server, i.e., the user reaction processing server 250.

Figure 3:
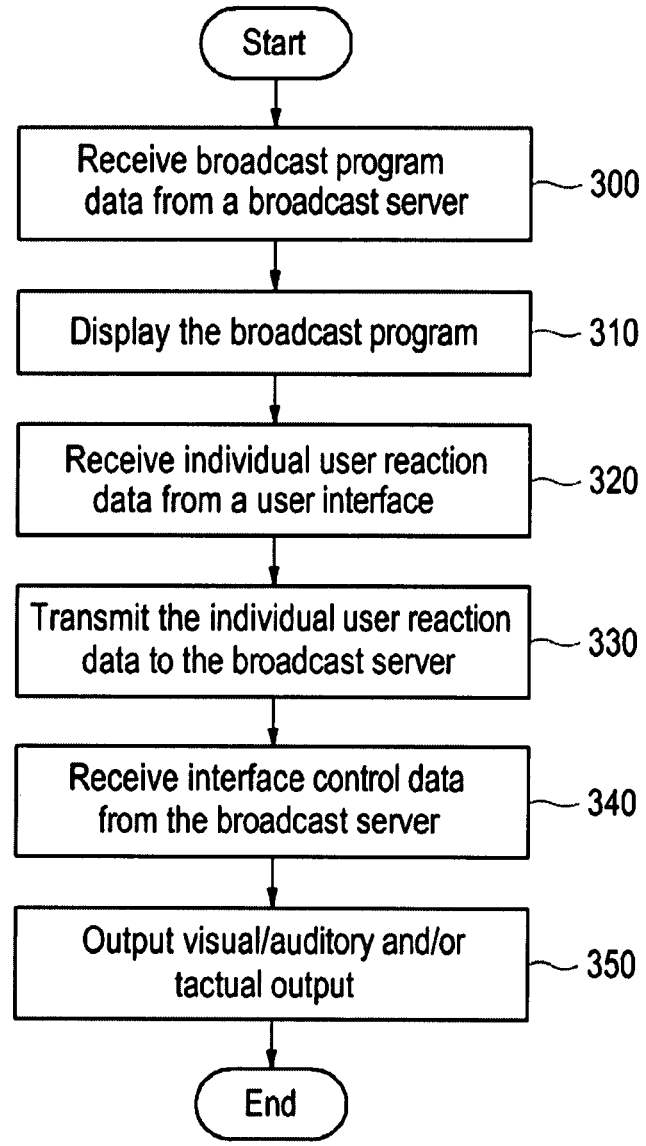
FIG. 3 illustrates a flow chart of a method for processing user reaction data in a user terminal according to one embodiment of the present invention.

FIG. 3 illustrates a flow chart of a method for processing user reaction data in a user terminal according to one embodiment of the present invention. Referring to FIG. 3, a user terminal such as user terminals 121, 122 and 123 (FIGS. 1 and 2) receives a broadcast program data from a broadcast server such as the broadcast server 130 (operation 300). For example, the broadcast program data may be sound, video or any other type of multimedia data. The broadcast program data may be relayed using RTP (Real-time Transport Protocol)/RTCP (RTP Control Protocol) or any other appropriate communication network protocols. In operation 310, the user terminal displays the program contained in the broadcast program data. In operation 320, the user terminal receives from user interface, such as a keyboard or a mouse, individual user reaction data of a user currently watching the program through the user terminal and transmits the received individual user reaction data to the broadcast server or a user reaction processing server such as the user reaction processing server 250 (FIG. 2) (operation 330). Thereafter, the user terminal receives the interface control data from the broadcast server or the user reaction processing server (operation 340) and outputs visual, auditory and/or tactual output based on the received interface control data (operation 350).

Figure 4:
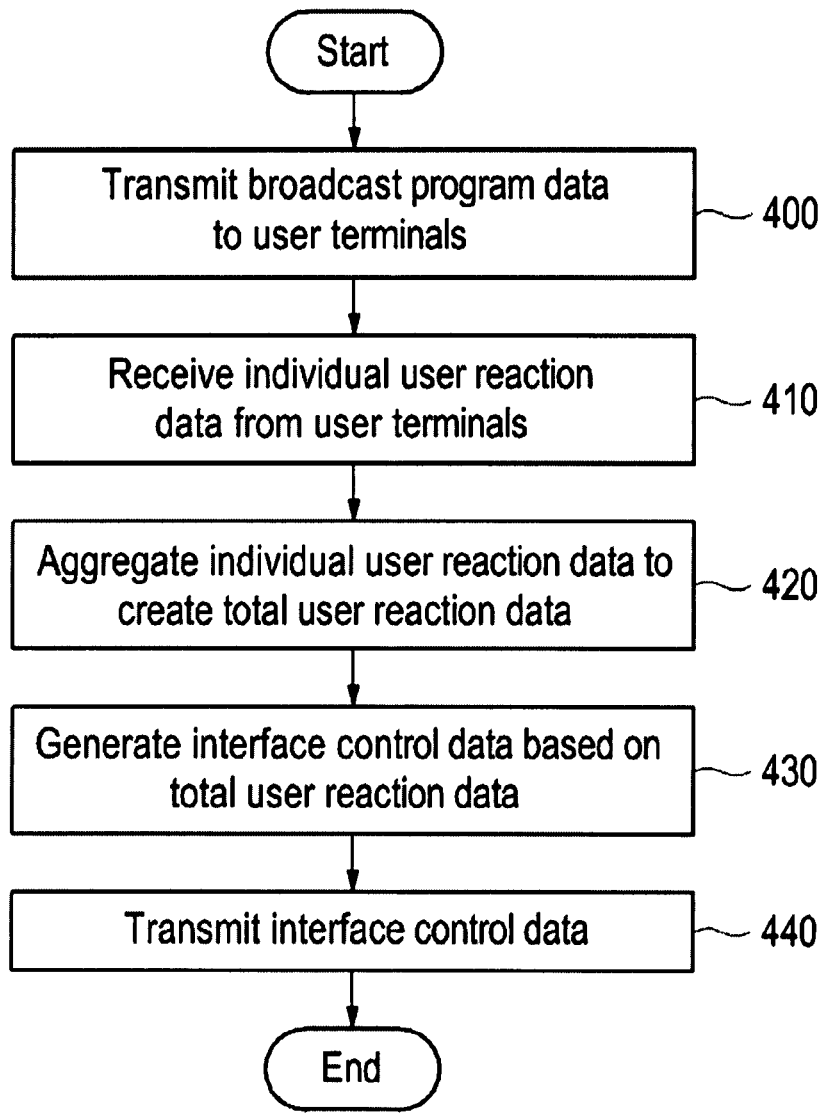
FIG. 4 illustrates a flow chart of a method for generating total reaction data based on individual reaction data received from the user terminals in the broadcast server according to one embodiment of the present invention.

FIG. 4 illustrates a flow chart of a method for generating total reaction data based on individual reaction data received from the user terminals in the broadcast server according to one embodiment of the present invention. Referring to FIG. 4, a broadcast server such as broadcast server 132 (FIG. 1) broadcasts a program by transmitting broadcast program data to a plurality of user terminals such as the user terminals 121, 122 and 123 (FIG. 1) (operation 400). In operation 410, the broadcast server receives the individual user reaction data from the user terminals and aggregates the received user reaction data to create the total user reaction data (operation 420). In operation 430, the broadcast server generates interface control data based on the generated total user reaction data. The operation regarding the generation of the total user reaction data and the interface control data is described in the descriptions pertaining to FIGS. 1 and 2. Thus, no further descriptions thereon should be needed. In operation 440, the broadcast server transmits the generated interface control data to the plurality of user terminals.

Figure 5:
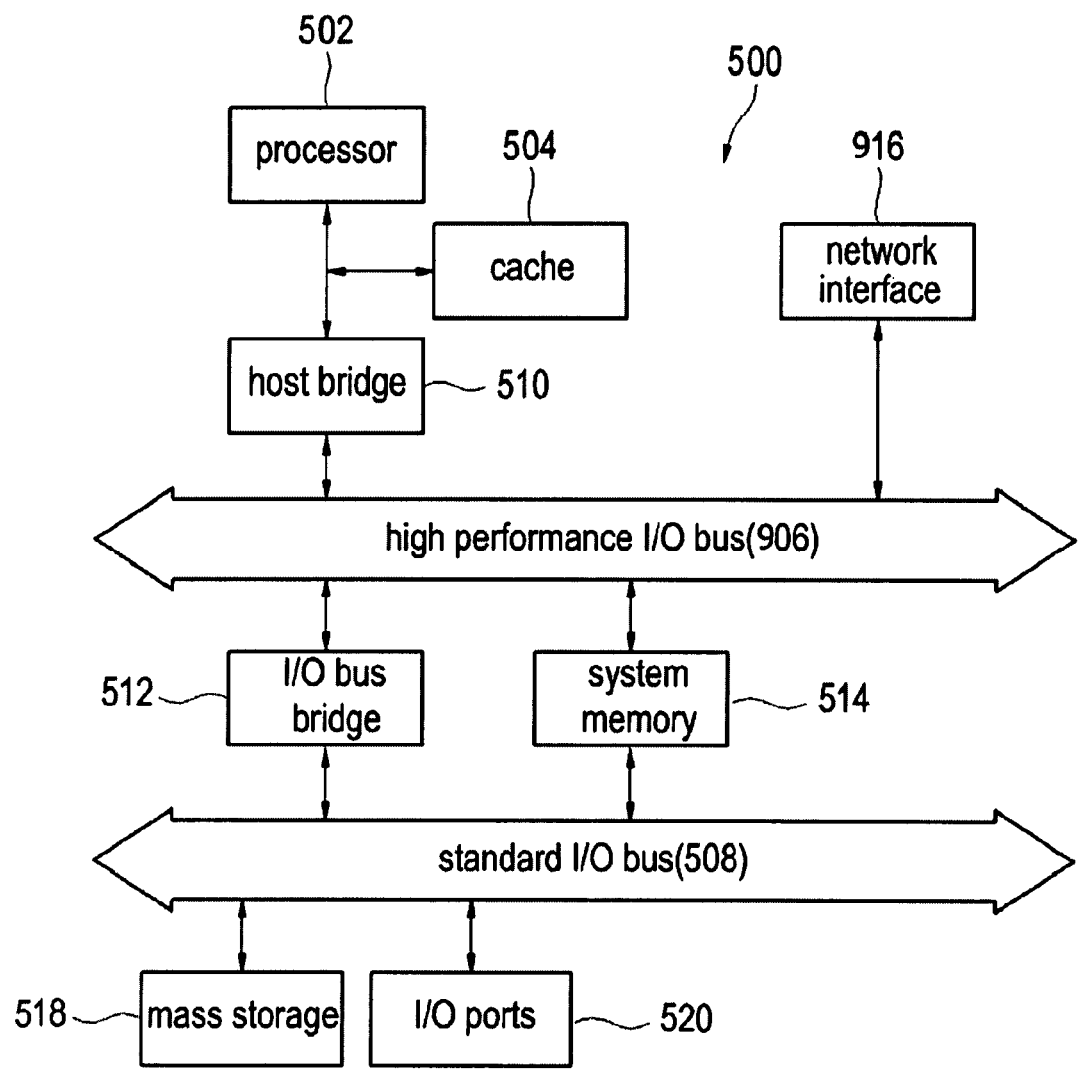
FIG. 5 illustrates an example computing system architecture, which may be used to implement embodiments of the present invention.

While the methods and systems of the present invention have been described above with reference to specific embodiments, some or all of the elements or operations thereof may be implemented using a computer system having a general purpose hardware architecture. FIG. 5 illustrates an example computing system architecture, which may be used to implement the above-described embodiments, which may be used to perform one or more of the processes or elements described herein. In one implementation, the hardware system 500 includes a processor 502, a cache memory 504 and one or more software applications and drivers directed to the functions described herein.

Additionally, the hardware system 500 includes a high performance input/output (I/O) bus 506 and a standard I/O bus 508. A host bridge 510 couples the processor 502 to the high performance I/O bus 506, whereas the I/O bus bridge 512 couples the two buses 506 and 508 with each other. A system memory 514 and a network/communication interface 516 couple to the bus 506. The hardware system 500 may further include a video memory (not shown) and a display device coupled to the video memory. A mass storage 518 and I/O ports 520 are coupled to the bus 508. The hardware system 500 may optionally include a keyboard and pointing device, as well as a display device (not shown) coupled to the bus 508. Collectively, these elements are intended to represent a broad category of computer hardware systems including, but not limited to, the general purpose computer systems based on the Pentium® processor manufactured by Intel Corporation of Santa Clara, Calif., as well as any other suitable processor.

The elements of the hardware system 500 are described in greater detail below. In particular, the network interface 516 provides communication between the hardware system 500 and any one of a wide range of networks such as an Ethernet (e.g., IEEE 802.3) network, etc. In case of the broadcast server 130 (FIGS. 1 and 2) and the user reaction processing server 250 (FIG. 2), the network interface 516 interfaces between the hardware system 500 and the network connected to the user terminals 121, 122 and 123 for allowing the hardware system 500 to communicate with those terminals. Similarly, in case of the user terminals 121, 122 and 123 (FIGS. 1 and 2), the network interface 516 interfaces between the hardware system 500 and the network connected to the broadcast server 130 and/or the user reaction processing server 250 for allowing the hardware system 500 to communicate with those servers. The mass storage 518 provides permanent storage for the data and programming instructions to perform the above-described functions implemented in the user terminals 121, 122 and 123, the broadcast server 130 or the user reaction processing server 250, whereas the system memory 514 (e.g., DRAM) provides temporary storage for the data and programming instructions when executed by the processor 502. The I/O ports 520 are one or more serial and/or parallel communication ports that provide communication between additional peripheral devices, which may be coupled to the hardware system 500.

The hardware system 500 may include a variety of system architectures. Further, various components of the hardware system 500 may be rearranged. For example, the cache 504 may be on-chip with the processor 502. Alternatively, the cache 504 and the processor 502 may be packed together as a "processor module," with the processor 502 being referred to as the "processor core." Furthermore, certain implementations of the present invention may not require or include all of the above components. For example, the peripheral devices shown coupled to the standard I/O bus 508 may be coupled to the high performance I/O bus 506. In addition, in some implementations, only a single bus may exist, with the components of the hardware system 500 being coupled to the single bus. Furthermore, the hardware system 500 may include additional components such as additional processors, storage devices or memories. As discussed below, in one embodiment, the operations of the online broadcasting system including the online broadcasting systems 100 and 200 described herein are implemented as a series of software routines run by the hardware system 500. These software routines comprise a plurality or series of instructions to be executed by a processor in the hardware system such as the processor 502. Initially, the series of instructions are stored in a storage device such as the mass storage 518. However, the series of instructions can be stored in any suitable storage medium such as a diskette, CD-ROM, ROM, EEPROM, etc. Furthermore, the series of instructions need not be stored locally and could be received from a remote storage device, such as a server on a network, via the network/communication interface 516. The instructions are copied from the storage device, such as the mass storage 518, into the memory 514 and then accessed and executed by the processor 502.

An operating system manages and controls the operation of the hardware system 500, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, which is available from Microsoft Corporation of Redmond, Wash. However, the present invention may be used with other suitable operating systems, such as the Apple Macintosh Operating System available from Apple Computer Inc. of Cupertino, Calif., UNIX operating systems, LINUX operating systems and the like.

Advantageously, the present invention provides a method and apparatus for "virtual co-presence" to the viewers watching a broadcast program through a communication network by relaying their reactions to the broadcast program in real-time. Further, while the present invention has been shown and described with respect to a preferred embodiment, those skilled in the art will recognize that various changes and modifications may be made without departing from the spirit and scope of the present invention as defined in the appended claims.

What is claimed is:

1. A method comprising:
    receiving, by a computing device, individual user reaction data from a plurality of user terminals, said individual user reaction data being generated at each of the plurality of user terminals in relation to a broadcast program broadcasted to the plurality of user terminals, said individual user reaction data indicating a mood or action a corresponding user at the each of the plurality of user terminals has to the broadcast program;
    aggregating, by the computing device, the individual user reaction data to create total user reaction data based on the received individual user reaction data;
    generating, by the computing device, interface control data based on the total user reaction data, wherein the interface control data, when executed, is operative to cause a client application to generate output indicative of the total user reaction data, the output comprising visual and audible output corresponding to the total user reaction data, the visual output represented by one or more avatars displaying a particular movement associated with the total user reaction data; and
    transmitting, by the computing device, the generated interface control data to at least one of the plurality of user terminals.

2. The method of claim 1, wherein said individual user reaction data comprises a plurality of individual user reaction fields.

3. The method of claim 1, further comprising transmitting broadcast program data to the user terminals, said broadcast program data comprising information on said broadcast program.

4. The method of claim 2, wherein said total user reaction data comprises a plurality of total user reaction fields, each of said total user reaction fields corresponding to one of said individual user reaction fields.

5. The method of claim 4, wherein said generating comprises generating each of said total user reaction fields based on the corresponding individual user reaction fields of the received individual user reaction data.

6. The method of claim 5, wherein said generating comprises calculating a total user reaction number for each of the user reaction fields.

7. A method comprising:
displaying, by a computing device, a broadcast program based on broadcast program data received from a broadcast server;
receiving, by the computing device, individual user reaction data from a user input interface, the individual user reaction data indicating a mood or action a corresponding user at each of a plurality of user terminals has to the broadcast program;
transmitting, by the computing device, the received individual user reaction data to a user reaction processing server or the broadcast server; and
receiving, by the computing device, interface control data from the user reaction processing server or the broadcast server wherein said interface control data is based on total user reaction data and is operative, when executed, to cause a client application to generate an output indicative of the total user reaction data, the output comprising visual and audible output corresponding to the total user reaction data, the visual output represented by one or more avatars displaying a particular movement associated with the total user reaction data; and
wherein said total user reaction data is based on the transmitted individual user reaction data and other individual user reaction data from the plurality of user terminals displaying the broadcast program broadcast by the broadcast server.

8. The method of claim 7, wherein said individual user reaction data comprises a plurality of individual user reaction fields.

9. The method of claim 7, further comprising generating at least one of visual, auditory and tactual outputs based on the received interface control data.

10. The method of claim 8, further comprising:
displaying a plurality of user reaction icons, each of the user reaction icons corresponding to one of said individual user reaction fields; and
receiving the individual user reaction data indicating at least one of said user reaction icons.

11. The method of claim 8, wherein said total user reaction data comprises a plurality of total user reaction fields, each of said total user reaction fields corresponding to one of said individual user reaction fields.

12. A server comprising:
a processor;
a storage medium for tangibly storing thereon program logic for execution by the processor, the program logic comprising:
communication logic executed by the processor for receiving individual user reaction data from a plurality of user terminals, said individual user reaction data being generated by each of the user terminals in relation to a broadcast program broadcasted to the user terminals, said individual user reaction data indicating a mood or action a corresponding user at the each of the plurality of user terminals has to the broadcast program; and
control logic executed by the processor for aggregating the individual user reaction data to create total user reaction data based on the received individual user reaction data, the total user reaction data used to generate output indicative of the total user reaction data and for display on the user terminals, the output comprising visual and audible output corresponding to the total user reaction data, the visual output represented by one or more avatars displaying a particular movement associated with the total user reaction data.

13. The server of claim 12, wherein said control logic is further for generating interface control data based on the total user reaction data, wherein the interface control data, when executed, is operative to cause a client application to generate an output indicative of the total user reaction data; and
said communication module transmits the generated interface control data to at least one of the user terminals.

14. The server of claim 12, wherein said communication logic is further for transmitting broadcast program data to the user terminals, said broadcast program data comprising information on said broadcast program.

15. The server of claim 13, wherein said individual user reaction data comprises a plurality of individual user reaction fields.

16. The server of claim 13, wherein said control logic is further for generating each of said total user reaction fields based on the corresponding individual user reaction fields of the received individual user reaction data.

17. The server of claim 15, wherein said total user reaction data comprises a plurality of total user reaction fields, each of said total user reaction fields corresponding to one of said individual user reaction fields.

18. The server of claim 16, wherein said control logic is further for generating each of said total user reaction fields by calculating a total user reaction number for each of the user reaction fields.

19. A computing device comprising:
a processor;
a storage medium for tangibly storing thereon program logic for execution by the processor;
a communication module executed at least in part by the processor;
a user interface displayed by the processor on a display; and
a control module executed at least in part by the processor and configured to receive broadcast program data from a broadcast server through the communication module and display a broadcast program based on the broadcast program data, the control module being configured to receive individual user reaction data from the user interface and transmit the received individual user reaction data to a user reaction processing server or the broadcast server through the communication module, the control module further being configured to receive interface control data from the user reaction processing server or the broadcast server, the individual user reaction data indicating a mood or action a user of the user terminal has to the broadcast program;
wherein said interface control data is based on total user reaction data and is operative, when executed, to cause a client application to generate an output indicative of the total user reaction data, the output comprising visual and audible output corresponding to the total user reaction data, the visual output represented by one or more avatars displaying a particular movement associated with the total user reaction data; and wherein said total user reaction data is based on the transmitted individual user reaction data and other individual user reaction data from a plurality of user terminals displaying the broadcast program broadcast by the broadcast server.

20. The computing device of claim 19, wherein said individual user reaction data comprises a plurality of individual user reaction fields.

21. The computing device of claim 19, wherein said control module generates at least one of visual, auditory and tactual outputs based on the received interface control data.

22. The computing device of claim 20, wherein said control module: displays a plurality of user reaction icons, each of the user reaction icons corresponding to one of said individual user reaction fields; and receives the individual user reaction data indicating at least one of said user reaction icons.

23. The computing device of claim 20, wherein said total user reaction data comprises a plurality of total user reaction fields, each of said total user reaction fields corresponding to one of said individual user reaction fields.

24. An online broadcasting system comprising:

a server configured to transmit broadcast program data to user terminals for display of a broadcast program based on the broadcast program data;

the server further configured to receive, from the user terminals, individual user reaction data, the individual user reaction data indicating a mood or action a corresponding user at each of the user terminals has to the broadcast program; and wherein said server is further configured to aggregate the received individual user reaction data to create total user reaction data;

the server further being configured to generate interface control data based on the total user reaction data, wherein the interface control data, when executed, is operative to cause a client application to generate an output indicative of the total user reaction data, the output comprising visual and audible output corresponding to the total user reaction data, the visual output represented by one or more avatars displaying a particular movement associated with the total user reaction data; and the server further being configured to transmit the generated interface control data to at least one of the user terminals.

25. A non-transitory computer readable storage medium tangibly storing thereon computer instructions for execution by a processor, the computer instructions causing the processor to:

display a broadcast program based on broadcast program data received from a broadcast server;

receive individual user reaction data from a user input interface displayed by a user terminal, the individual user reaction data indicating a mood or action a corresponding user at the user terminal has to the broadcast program;

transmit the received individual user reaction data to a user reaction processing server or the broadcast server; and receive interface control data from the user reaction processing server or the broadcast server wherein said interface control data is based on total user reaction data and is operative, when executed, to cause a client application to generate an output indicative of the total user reaction data, the output comprising visual and audible output corresponding to the total user reaction data, the visual output represented by one or more avatars displaying a particular movement associated with the total user reaction data; and wherein said total user reaction data is based on the transmitted individual user reaction data and other individual user reaction data from a plurality of user terminals displaying the broadcast program broadcast by the broadcast server.

* * * * *